INVENTORS.
MALBONE WATSON GREENE
RAY IRVING WILSON
BY
Fowler, Knobbe & Gambrell
ATTORNEYS.

Dec. 13, 1966  M. W. GREENE ETAL  3,290,921
SENSING APPARATUS FOR DETERMINING THE PARTIAL PRESSURE
OF PARAMAGNETIC GASES IN A MIXTURE OF GASES
Filed Dec. 9, 1963  2 Sheets-Sheet 2
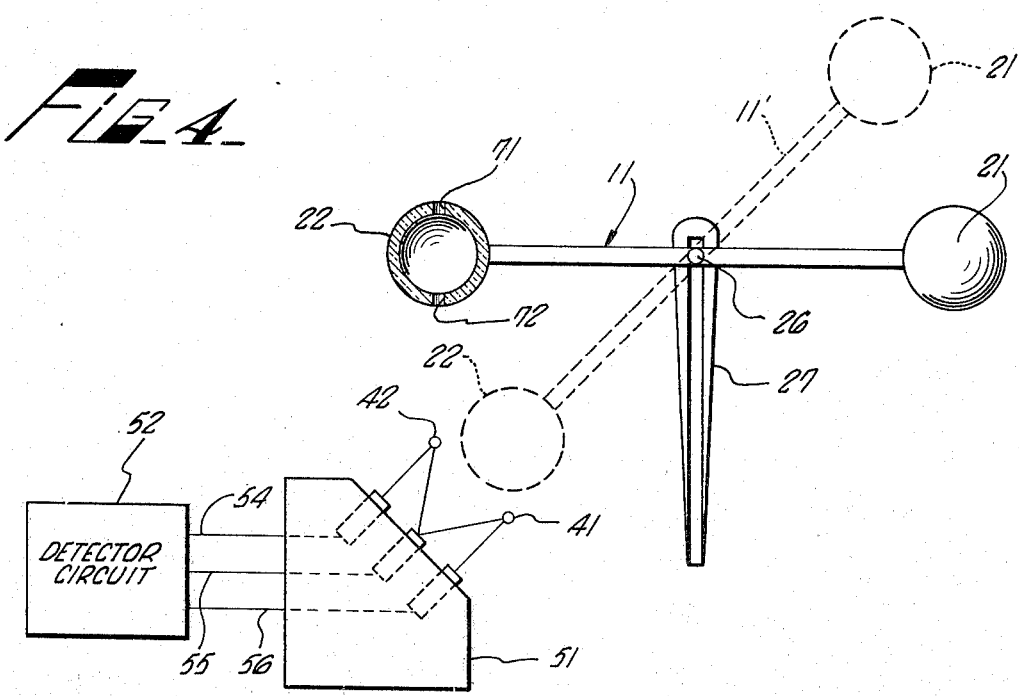
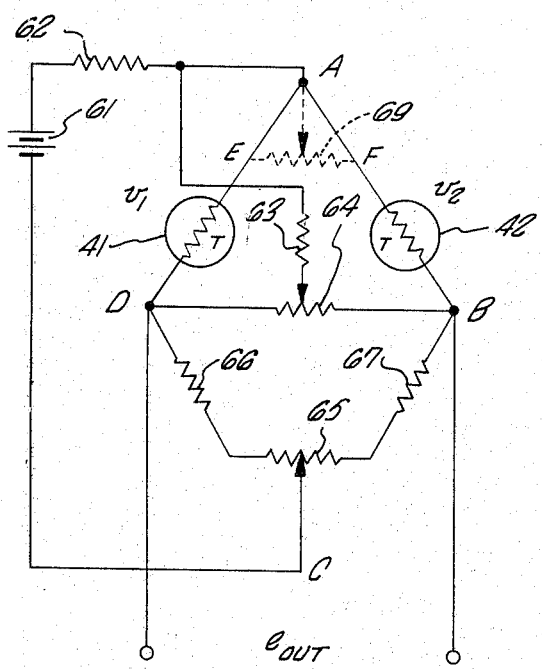
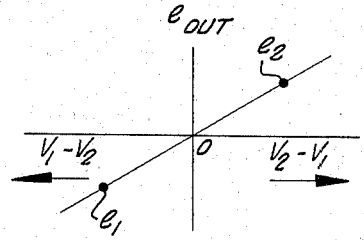
INVENTORS.
MALBONE WATSON GREENE
RAY IRVING WILSON
BY
ATTORNEYS.

United States Patent Office 3,290,921
Patented Dec. 13, 1966

3,290,921
SENSING APPARATUS FOR DETERMINING THE PARTIAL PRESSURE OF PARAMAGNETIC GASES IN A MIXTURE OF GASES
Malbone Watson Greene, Covina, and Ray Irving Wilson, La Habra, Calif., assignors to Beckman Instruments, Inc., a corporation of California
Filed Dec. 9, 1963, Ser. No. 328,829
4 Claims. (Cl. 73—27)

This invention relates generally to apparatus for determining the partial pressure of a paramagnetic gas in a mixture of gases and, more particularly, to thermosensing means for producing an electrical output proportional to an input signal.

Reference is made to application Serial No. 328,724 by Arnold O. Beckman, now Patent No. 3,234,540 entitled "Meter Pointer Position Monitoring Means Utilizing Heat Absorbing Vane and Thermistors," filed concurrently herewith, which discloses a meter incorporating some of the principles disclosed in this application.

Apparatus for detecting the partial pressure of one gas in a mixture of gases utilizing its paramagnetic characteristic has been previously disclosed. In Patent 2,416,-344 issued on February 25, 1947, Linus Pauling describes apparatus for measuring the partial pressure of oxygen by supporting a test body in a gaseous atmosphere and establishing an inhomogeneous magnetic field therein. The force of the field on the test body provides an indication of the partial pressure of the oxygen constituting a part of the mixture of gases.

It is a fact that oxygen is trongly paramagnetic. For example, its volume susceptibility at one atmosphere pressure and 20° C. is approximately $+142 \times 10^{-9}$ c.g.s. units, whereas most other gases are diamagnetic with volume susceptibilities substantially lower. Typical is nitrogen which has a volume susceptibility of approximately $-0.40 \times 10^{-9}$ c.g.s. units. Taking advantage of this distinct difference in volume susceptibilities, the Pauling apparatus measures the magnetic susceptibility of a gas mixture including oxygen. Other paramagnetic gases, though they have smaller volume susceptibilities than oxygen, are chlorine dioxide, nitrogen dioxide and nitric oxide.

The Pauling invention is based on the principle that a nonmagnetic test body when placed in a homogeneous magnetic field does not experience any torsional force, whereas when it is placed in an inhomogeneous field (established, for example, by wedge-shaped pole pieces) there is a force set up which acts in the direction of the greatest inhomogeneity of the field. The magnitude of this force is proportional to the volume of the test body, the difference in volume magnetic susceptibility of the medium and the test body, the magnetic field strength and the inhomogeneity of the field.

When the test body is not suspended in a vacuum, the force acting on the test body is the difference between the force resulting from the interaction of the test body and the magnetic field and the pressure exerted on the test body by the medium. From the foregoing it can be seen that the force acting on the test body, which causes a proportional torsional displacement of it, varies directly with the magnetic susceptibility of the surrounding medium. As a result, all of these factors can be systematically correlated with each other.

In the Pauling apparatus described in Patent 2,416,344, the displacement of the fiber-supported test body from its equilibrium position is measured by a scale cooperating with a light source and mirror supported on the test body. While such light means is superior to many mechanically connected systems for measuring the displacement of a test body from its normal position, it still has the disadvantage that such transducers normally encounter. To overcome the many disadvantages of light beam deflection systems and to provide an electrical output signal, recourse has been had to photo-sensitive means. But they, too, have drawbacks which compromise the inherent accuracy of the Pauling device. The power inputs to the required incandescent lamps are substantial, the lamp filaments must operate at high temperatures and they must be replaced at frequent intervals. Moreover, focusing the beams, the presence of dust on the optical elements, and amplifier drift create additional burdens.

The principal object of the present invention is to provide improved sensing means which is not subject to the well-known disadvantages of mechanical systems nor to the disadvantages which attend the use of light sources, mirrors and photo-sensitive means.

In working with the conventional Pauling Oxygen Analyzer of the type described above, the present inventor sought a detecting system that would not require a light source nor a mechanical force to drive the recorder. The need was for a device sensitive to the mechanical position of the test body but not mechanically connected to it. To this end, the present invention utilizes thermal sensitive elements supported in spaced-apart relation adjacent the path of the test body. Taking advantage of the fact that the thermal conductivity of the test body with respect to that of the ambient gases surrounding it can be controlled, it is possible to use the test body not only as a mechanical indicator of the partial pressure of the paramagnetic gas present in the atmosphere in which it is suspended, but also as a heat sink to absorb differential quantities of the heat generated by the thermal sensitive elements.

In the exemplary embodiment of the present invention, a pair of thermistors are supported in spaced-apart positions adjacent the path of one of the spherical members of the dumbbell-shaped test body so that the instant position of the spherical member causes it to absorb heat differentially from the thermistors. By placing the thermistors in adjacent legs of a Wheatstone bridge, the sensitivity of the system is doubled, and the output signal from the bridge is a signal systematically correlatable with the torsional displacement of the test body.

In operation, the invention provides a continuous indication of the mechanical displacement of the dumbbell. As a partially paramagnetic gas mixture is introduced into the chamber and the test body rotates under the influence of the inhomogeneous magnetic field, it moves further away from one of the thermistors and closer to the other. This causes the test body to absorb differential quantities of heat from the thermistors. This unbalances the Wheatstone bridge and provides an output directly proportional to the force exerted on the test body.

In order to meet the requirement of this system, certain changes must be made in the basic Pauling Analyzer but none of them materially affect its sensitivity to the partial pressure of oxygen in the ambient atmosphere. To illustrate, if the hollow glass balls of the test body are filled with air or a mixture of air, oxygen and nitrogen—the normal procedure for providing a test body having a convenient magnetic susceptibility—there may be an error introduced. For example, if the thermal conductivity of the sample gas is such that it greatly exceeds that of the test body fill gas, the temperature of an element will rise—rather than fall—as the ball comes closer. To avoid this, the conductivities are equalized by puncturing the ball adjacent the thermal sensitive elements so that sample gas contacts all surfaces of the ball. The temperature of the element will therefore depend on the thermal transfer properties of the gas and ball, not on the relative thermal conductivity of the sample gas and fill gas of the ball.

To provide optimum sensitivity, it is desirable that the thermal sensitive elements lose a significant portion of their heat energy to the test body and that the test body rapidly dissipate this heat to the surrounding atmosphere. This is accomplished by making the heat absorbing part of the test body out of a material having a large coefficient of thermal conductivity as compared to the sample gas, and by having the area of the ball large when compared to the area of thermal sensitive elements. A material having a large coefficient of thermal conductivity can be applied to a not-so-highly conductive test body if it is otherwise desirable, e.g. by gold splutering. Or if other considerations dictate, a heat absorber can be attached to the test body to move in a path proximate to the sensitive elements.

In the use of the present invention, thermo-magnetic convection effects must be minimized, although some oxygen analyzers use the principle purposely to affect the analysis. In this latter type of analyzer, one thermosensitive element is disposed in the high intensity inhomogeneous magnetic field and another in a geometrically similar low-intensity magnetic field. The relative changes in thermal conductivity and thermal convection (due to the gravitational field) are largely cancelled out. But when the gas environment includes a paramagnetic gas, the convection due to the thermal gradient and magnetic field gradient causes heat to flow from the element in the inhomogeneous field more rapidly than from the one in the low magnetic field. As a consequence, the change in the temperature of the element is influenced both by the thermo-magnetic coefficient and the volume magnetic susceptibility of the sample gas.

The means employed in the present invention to avoid the undesirable effect of thermal-magnetic convection is to create a single large inhomogeneous field in the region of the sealed ball of the test body only. While additive torques are not provided when such a technique is used, as they are in the conventional Pauling Analyzer, the asymmetry does not materially affect the sensitivity of the analyzer. It does permit the sensing means to avoid the influence of thermal-magnetic convection.

These and other objects, advantages, and features of the invention may be more fully understood when the following detailed description is read with reference to the drawings in which:

FIG. 4 is a partial schematic illustrating the location of the thermal sensitive elements with respect to the test body of a modified Pauling Analyzer in accordance with the present invention;

FIG. 5 is an exemplary circuit diagram including the thermal sensing elements to provide an output signal; and, FIG. 6 is a graphic representation of output signals of the bridge circuit of FIG. 5.

Figure 2:
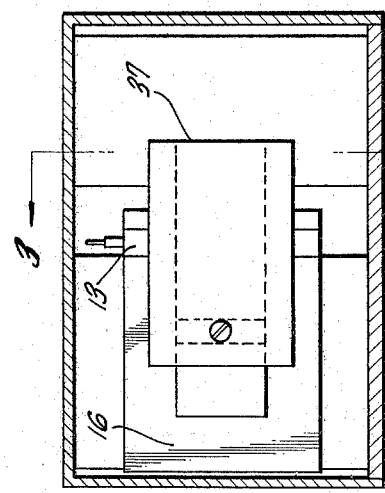
FIG. 2 is a right side view of the exemplary embodiment of the present invention.
Figure 3:
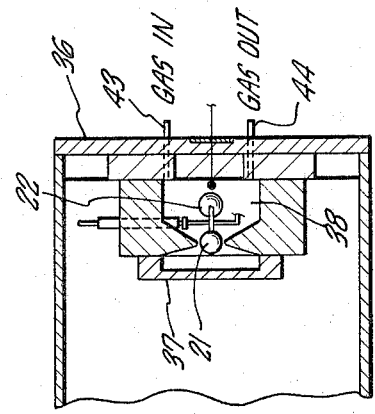
FIG. 3 is a section taken along line 3—3 of FIG. 2.
Figure 1:
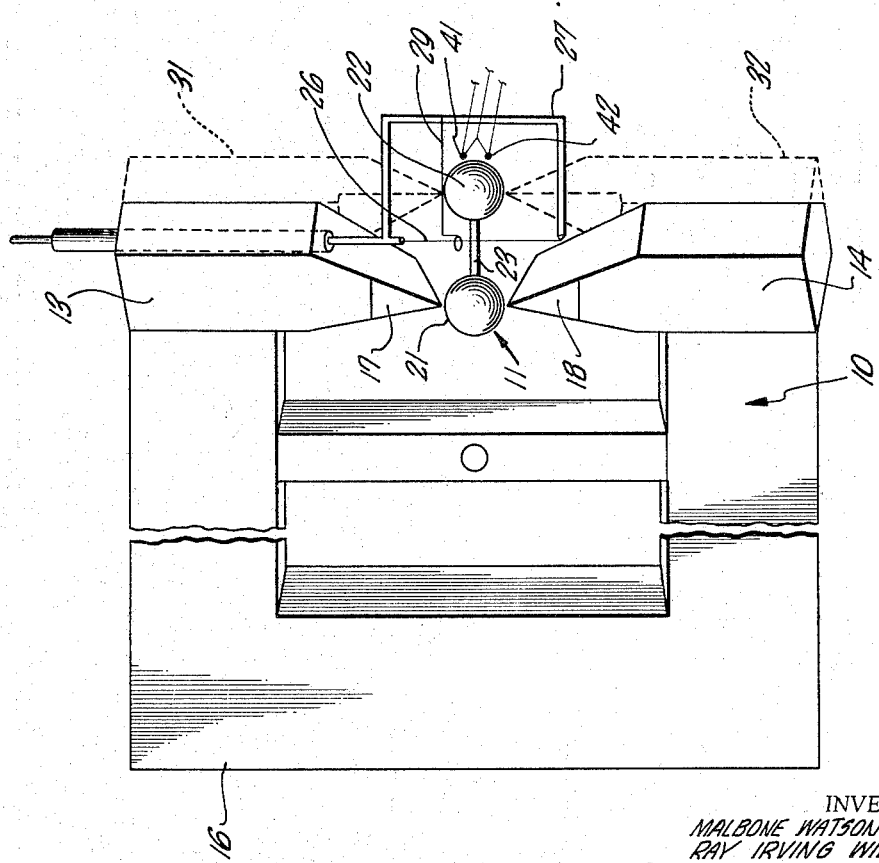
FIG. 1 is a partial perspective of an oxygen analyzer modified in accordance with a preferred embodiment of the present invention.

Looking to FIGS. 1–3, the modified oxygen analyzer consists primarily of a magnet 10 and a test body 11 supported for rotation between the pole faces of the magnet 10. The magnet 10 includes pole pieces 13 and 14 joined by a return member 16 and having shaded faces 17 and 18.

The test body 11 consists essentially of two spherical members 21 and 22 connected by a member 23 to approximate the shape of a dumbbell. The connecting member 23 is connected to a supporting fiber 26 which is held in proper juxtaposition to the magnet 10 by yoke 27. Viscous dampening can be provided by an oil-laden loop 29.

The test body 11 is supported so that spherical member 21 is balanced intermediate the pole faces 17 and 18. In the usual oxygen analyzer, a second pair of shaded pole pieces 31, 32 (indicated by the dotted lines) would cooperate with the oppositely disposed spherical member 22.

In the modification described herein, the second pole pieces 31 and 32 are omitted to obviate the effect of thermo-magnetic convection on the measurement of the volume susceptibility of the sample gases, as explained above. Since a field gradient is needed to produce thermo-magnetic convection, it is also possible to minimize or eliminate it by locating the elements in a high but constant magnetic field.

Another expedient would be to intentionally create thermo-magnetic convection as an error compensation signal for the bridge. Alternatively, both elements may be subjected to cancelling thermo-magnetic convection effects. Yet another means of controlling the magnitude of the thermo-magnetic convection effect is to introduce known quantities of helium or nitrogen or carbon dioxide. High thermal conductivity gases cause the thermistors to operate at lower temperatures with the result that they are less sensitive to thermo-magnetic convection.

Still referring to FIGS. 1–3, a pair of thermistors 41 and 42 (shown schematically in FIG. 1) are supported in spaced-apart relation adjacent the path of ball 22. The test body 11 and associated magnet 10 are enclosed by plates 36 and 37 and others (not shown) to provide a chamber generally designated as 38 to contain the atmosphere of sample gas. Looking particularly at FIG. 3, there is provided a gas inlet aperture 43 and a gas outlet aperture 44 so that the sample gas may be caused to flow through the chamber 38.

A small flow of a sample gas mixture past the test body and thermally sensitive elements, e.g. $\leq 50$ ml./min., is desirable. Therefore, it is common practice to use a porous diffusion element (not shown), such as sintered stainless steel, to transfer a part of the sample gas flow into and out of the test chamber. Generally direct flow systems are employed only when small samples are used.

FIG. 4 more clearly illustrates the operation of the present system. In this figure, like parts are given like numbers although certain ones are omitted to more clearly explain the operation. The test body 11 is normally in mechanical equilibrium as shown. Upon the application of an inhomogeneous magnetic field, the test body 11 assumes the normal equilibrium position shown by the position of test body 11'. This position, it will be noted, places the test ball 22 equidistant between the thermistors 41 and 42.

The thermistors 41 and 42 are supported by multiple leads in a support member 51 which in turn is connected to a detector circuit 52 by individual leads 54, 55 and 56. The detector circuit 52 with which the thermistors 41 and 42 are associated is schematically illustrated in FIG. 5.

Referring particularly to FIG. 4, however, the position of dumbbell 11 represents the mechanical equilibrium position. As the magnetic susceptibility of the sample gas changes, it causes the test body 11 to rotate about the fiber axis 26 which displaces test ball 22 either clockwise or counterclockwise with respect to its normal position 11'. Depending upon which way it goes, the output of the bridge circuit in magnitude and polarity will change. The output is calibrated with the rotation of the test body 11 from position 11'.

In the exemplary circuit illustrated in FIG. 5, a battery 61 is connected through current limiting resistor 62 to nodes A and C of a Wheatstone bridge, and the thermistors 41 and 42 are connected in the AD and AB legs thereof. Balancing fixed resistors 66 and 67 are in the BC and CD legs, and node A is also connected through resistor 63 to the arm of potentiometer 64, the resistance element of which connects nodes B and D. The output from the Wheatstone bridge is taken off between nodes B and D.

Node C is actually conected to the arm of potentiometer 65 so that the output of the bridge, at least over a susbtantial range of oxygen content in the mixture, can be made relatively independent of the thermal activity of the sample gas. The addition of a potentiometer 69 at node A (shown dotted) coupled with removal of leads AE and AF would permit further desensitizing of the circuit to the thermal activity of the sample gas and permit an optimum operting point to be selected.

With the circuit illustrated in FIG. 5 and thermistors positioned as illustrated schematically in FIG. 4, if ball 22 of test body 11 moves more closely adjacent thermistor 42, the output BD will be influenced by the increased absorption of heat from thermistor 42 coupled with the decreased absorption of heat from thermistor 41. Hence the output will be some negative voltage $e_1$. At the equilibrium position, the output of the bridge is nulled. Beyond this point, the influence of thermistors 41 and 42 reverse, the temperature of thermistor 41 being lowered as it transfers more heat to ball 22, while the temperature of thermistor 42 rises, and the output of the bridge goes positive ($e_2$).

Since the relative magnitude of the resistances of the thermistors 41 and 42 depend directly on the degree to which they give up heat to the heat sink 22, there is provided a continuous output signal systematically correlatable with an instant position of the test body 11.

In the modification of the invention shown by the dotted lines at node A of FIG. 5 and briefly referred to above, the thermistors 41 and 42 are separately connected so that a potentiometer 69 can be used to adjust the magnitude of the thermally insensitive resistance in series with the thermistors. A better operating condition can thus be obtained. With this third potentiometer 69 in the circuit, it would be used in conjunction with potentiometer 64 to provide optimum performance with potentiometer 65 set at its middle point. Potentiometer 65 could then be used to make small zero adjustments without upsetting the series-shunt compensation network.

By way of illustration, the circuit of FIG. 5 was operated with the following component values:

Thermistors 25, 26_____ AVECO type A–177, 100K ohms at 25° C., matched to accord ± 1%, I.R. drop from 100K to 5K.
Battery 61_____ 16 v. D.C.
Resistors:
   62_____ 500 ohms.
   63_____ 100K ohms.
   64_____ 500K ohms.
   65_____ 100 ohms.
   66_____ 20K ohms.
   67_____ 20K ohms.

By empirically adjusting the arms of potentiometers 64 and 65, the dependence of the $e_{out}$ for oxygen content of between 0 and 20% was made relatively independent of the thermal conductivity of the sample gas.

With the foregoing component values, the spacing between the .010 inch diameter thermistor beads was approximately 3.5 mm., the diameters of the test balls 21 and 22 were approximately 5 mm., the sealed ball 21 was filled with air, and an inhomogeneous field of approximately 5000 gauss maximum strength was established.

With this arrangement, the torsional constant of the suspension fiber permitted a 100 mm. Hg of $O_2$ to produce 1° rotation of the test body.

The means used to equalize the gas impinging upon the balls of a test body, both within and without, is illustrated most clearly in FIG. 4 where test ball 22 is shown to have symmetrical apertures 71, 72 so that at all times the atmosphere interior of ball 22 is the same as that contacting its external surface. While the form of the apertures may be varied, it is desirable to symmetrically orient them so that there are no hot or cold spots representing a temperature differential between the interior and exterior surfaces of the ball.

While the foregoing invention has been described with respect to particular apparatus, it should be apparent to those skilled in the art that the principle of converting a mechanical movement to an electrical signal by absorbing heat from temperature sensitive elements adjacent the mechanical element has broader applications. For this reason, the present invention should be limited only to the extent of the specific language of the claims.

What is claimed is:
1. Apparatus for determining the partial pressure of a paramagnetic gas in a mixture of gases comprising, in combination,
   means for establishing an inhomogeneous magnetic field,
   a gravitationally balanced test body supported in said magnetic field for movement about an axis,
   said test body having at least one part with a coefficient of heat conductivity greater than that of the mixture of the gases,
   means for confining the mixture of gases around said test body,
   temperature sensitive means disposed adjacent the path of movement of said test body part, and
   means responsive to changes in the temperature of said temperature sensitive means as it gives up heat to said part of said test body to provide a signal correlatable with the displacement of said test body about its axis.

2. Apparatus for determining the partial pressure of a paramagnetic gas in a mixture of gases in accordance with claim 1, wherein said test body includes a pair of oppositely disposed spherical members, one of which is said test body part, and including means for equalizing the conductivity of gases contacting the interior and exterior surfaces of said spherical member.

3. Apparatus for determining the partial pressure of a paramagnetic gas in a mixture of gases in accordance with claim 1 wherein said test body part is formed of heat absorbing glass and it is apertured to equalize the conductivity of gases contacting its surfaces.

4. In apparatus for determining the partial pressure of a paramagnetic gas in a mixture of gases by suspending a test body in an inhomogeneous magnetic field and measuring the rotational displacement of the body from an equilibrium position when the environment includes such gas mixture, the improvement in detection means comprising,
   a test body made of a heat absorbing material;
   temperature-sensitive resistance elements supported in spaced-apart relation immediately adjacent the path described by said test body as it rotates; and
   a Wheatstone bridge including said resistance elements, the output of said bridge being correlatable with the rotational displacement of said test body from its equilibrium position.

References Cited by the Examiner
UNITED STATES PATENTS

| | | | |
|---|---|---|---|
| 2,389,615 | 11/1945 | Eder | 73—204 |
| 2,416,344 | 2/1947 | Pauling | 73—27.5 X |
| 2,605,094 | 7/1952 | Hancock | 73—516 |
| 3,064,473 | 11/1962 | Heer et al. | 73—204 X |
| 3,234,540 | 2/1966 | Beckman | 340—266 |

RICHARD C. QUEISSER, *Primary Examiner.*

J. FISHER, *Assistant Examiner.*